Feb. 5, 1957 M. R. ANDREAE 2,780,248
APPARATUS FOR OPERATING VIBRATORY JIGSAW
Filed Jan. 29, 1953
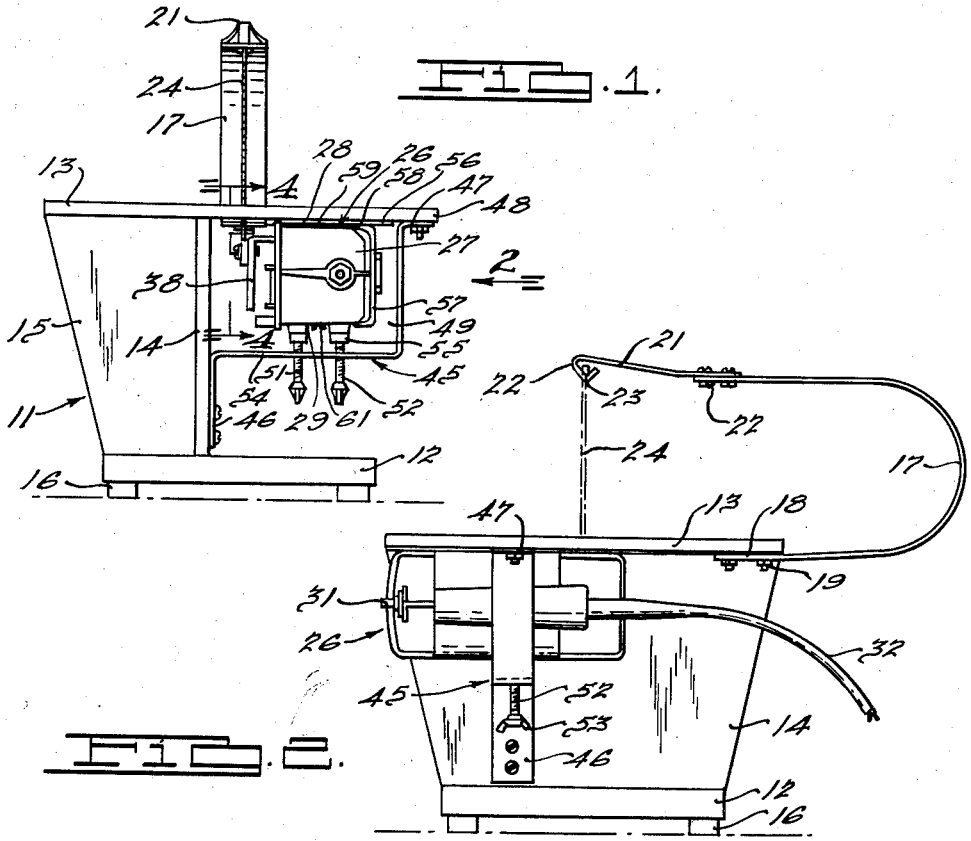
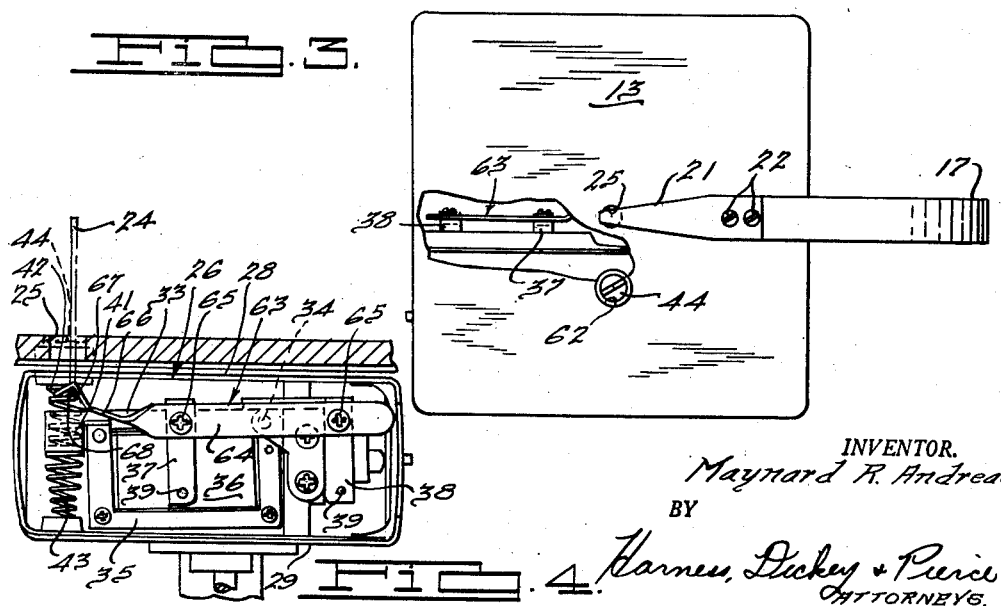
INVENTOR.
Maynard R. Andreae
BY
Harness, Dickey & Pierce.
ATTORNEYS.

United States Patent Office 2,780,248
Patented Feb. 5, 1957

2,780,248

APPARATUS FOR OPERATING VIBRATORY JIGSAW

Maynard R. Andreae, Bloomfield Hills, Mich., assignor to Syncro Corporation, Oxford, Mich., a corporation of Michigan Application January 29, 1953, Serial No. 333,972

5 Claims. (Cl. 143—73)

This invention relates to jigsaws, and more particularly to an apparatus for operating vibratory saws having a work table through which the saw blade extends.

It is an object of the present invention to provide a novel and improved apparatus for operating a jigsaw of the above type which is efficient and economical, which eliminates the cost of providing a motor built in as part of the jigsaw unit, and which permits the motor to be used for other purposes when the jigsaw is not in use.

It is also an object to provide an improved jigsaw which is extremely economical to manufacture, and more specifically, one in which means are provided for utilizing a power operated hand tool as the motor means for the jigsaw blade, whereby the power-operated tool can serve a dual purpose in a workshop and the cost of building motor means into the jigsaw is eliminated.

It is another object to provide an improved jigsaw having the above characteristics, in which a vibratory power operated hand tool such as a sander can be easily secured beneath the work table of the saw, and which has means for securing the blade to the portion of the sander which normally oscillates the paper platen.

It is a further object to provide a device of the above nature in which the securing means for the tool assembly beneath the work table allows limited adjustment of the position of the tool in order to properly align the parts of the device.

It is another object to provide an improved jigsaw as above described in which the securing means for the power operated hand tool is of a versatile nature so that tools having different shapes of housings can be securely held in operating position.

It is a further object to provide an improved jigsaw of the above nature in which a power operated hand sander can be operatively held in position and secured to the saw blade without the necessity for dismantling the sander parts, other than removing the paper platen thereof.

It is also an object to provide a device of the above character in which the parts present in the power-operated hand tool for aiding the vibratory characteristics of the tool function when the sander is connected to the saw blade to provide an efficient cutting stroke for the blade.

Other objects, features, and advantages of the present invention will become apparent from the subsequent description, taken in conjunction with the accompanying drawings.

In the drawings:

Figure 1 is a front elevational view of the improved jigsaw of my invention showing a vibratory power operated hand sander secured in position beneath the work table and operably connected to the saw blade;

Figure 2 is a side elevational view taken in the direction of arrow 2 of Figure 1, showing the position of the sander casing and the securing elements;

Figure 3 is a plan view of the improved jigsaw, with parts broken away to show the attaching means for the saw blade and the access opening for the spring adjustment screw; and Figure 4 is a fragmentary cross-sectional view taken along the line 4—4 of Figure 1 and showing the attaching member for securing the saw blade to the platen securing members.

According to the invention, a vibratory power operated hand tool may be releasably secured to a portion of a jigsaw stand in such position that the vibratory motion of the tool is in the direction of the saw blade, and the tool is connected to one end of the blade so that the latter is driven thereby. More specifically, the invention may utilize a vibratory hand sander from which the paper platen is removed, the sander being secured beneath the work table of the jigsaw so that the platen supports vibrate transversely to the table, an adaptor being provided for connecting these supports to the lower end of the saw blade.

As shown in the preferred embodiment, the device comprises a stand generally indicated at 11 having a base portion 12 and a work table 13, the work table being supported in spaced relation above the base 12 by an upright supporting wall 14 and wall 15 disposed at right angles to wall 14. Rubber pads or similar foot members 16 are preferably secured to the undersurface of base 12. A C-shaped blade supporting member 17 is secured at its lower end 18 to the undersurface of work table 13 adjacent one edge thereof, for example by bolts 19. The upper end of blade support 17 has secured thereto a leaf spring 21 by means of bolts 22, and spring 21 has a hook shaped forked outer end 22 for retaining pin 23 attached to the upper end of saw blade 24. The work table is provided with an apertured portion 25 through which saw blade 24 extends.

The vibratory driving means for the saw blade comprises the motor portion of a power operated vibratory hand sander of a well known type, the sander being generally indicated at 26 in figures. It will be understood that although a particular type of sander is shown in the drawings as being mounted for operating purposes in the jigsaw, the invention is also applicable to other types of vibratory power operated hand tools which could be secured in a similar way to the jigsaw stand and operably connected to the jigsaw blade. In the present instance, the sander shown is provided with a casing 27 having side walls 28 and 29, hereinafter referred to as the upper and lower side walls respectively because of their relative position when the sander is secured to the jigsaw stand. The sander also has a hand operated on-and-off switch 31, and a lead 32 for the power supply. It is not believed necessary to describe further details of the sander construction other than those described below, since in themselves these elements form no part of the present invention.

The sander shown is of the type having a vibratory armature 33 which is pivotally connected at 34 to the magnet frame 35, so as to be vibrated when coil 36 is energized. The armature has connected thereto a pair of platen attaching elements 37 and 38, these elements being in the form of L-shaped brackets which extend from the armature and have threaded apertures 39 in their outer co-planar legs seen in Figure 4 for securing a sander platen (not shown) thereto. When the sander is being used as a sander, the platen is secured to brackets 37 and 38 and vibrates in a plane about the axis of pivot 34.

The outer end of the armature is provided with an extension 41 disposed between a pair of springs 42 and 43. The outer ends of springs 42 and 43 are supported by the insides of upper and lower walls 28 and 29 respectively, spring 42 being provided with an adjusting screw 44 as shown best in Figures 3 and 4. The purpose of the springs is to enhance the vibrational characteristics of armature 33, and the amount of compression in the springs may be adjusted to suit various conditions by rotating adjusting screw 44. This spring arrangement is shown for example in co-pending application Serial No. 109,118 filed August 8, 1949 by Thomas Frazer Carmichael for Vibratory Electric Motor and Mechanism Driven Thereby, issued March 17, 1953 as Patent No. 2,632,121, and assigned to the assignee of the present application.

The mounting means for securing the sander beneath the work table of the jigsaw comprises a mounting bracket generally indicated at 45 having a lower leg 46 secured to wall 14 and an upper leg 47 secured to the underside of table 13 adjacent edge 48 thereof remote from wall 14. The intermediate portion of the bracket 45 is substantially L-shaped so as to provide a mounting space indicated at 49 between the bracket and the underside of table 13, this mounting space being on the opposite side of wall 14 from the transverse wall 15. In utilizing the device of this invention, the sander 26 is secured within mounting space 45 so that the platen-supporting legs of brackets 37 and 38 are in a plane parallel to the direction of movement of saw blade 24. For this purpose, a pair of mounting screw clamps 51 and 52 having handles 53 are threadably mounted in the lower leg 54 of the mounting portion of bracket 45 which is in spaced parallel relation below work table 13. The upper ends of these clamps are provided with pads 55 adapted to engage lower wall 29 of the sander housing. The undersurface of work table 13 is provided with a flat pad 56 which is engaged by upper wall 28 of the sander housing.

In the present example, the sander housing is further provided with a hand gripping portion 57 for normal use of the sander, and it will be seen that the upper edge 58 of this hand gripping portion also engages pad 56. It should be noted that due to the nature of the mounting means the ventilating spaces 59 and 61 of the sander housing are left free so that normal ventilation may take place. In particular, the pads 55 on the mounting clamps engage the housing on either side of the ventilating space 61, while the vanes adjacent ventilating space 59 as well as the flange 58 of the hand gripping portion maintain a space between housing wall 28 and upper pad 56. The sander is preferably so mounted that the adjusting screw 44 is facing upwardly, and the work table is in this case provided with an apertured portion 62 so that the adjusting screw is accessible from above the work table. It will be observed that due to the independent nature of mounting camps 51 and 52, various shapes of housing could be secured beneath the work table, and of course the manner of clamping could be varied to hold different types of housings.

The means for operatively securing the lower end of saw blade 24 to the vibratory elements of the sander comprises in the illustrated embodiment a saw blade gripping attachment generally indicated at 63 having an elongated flat portion 64 which can be secured to the co-planar legs of platen holding members 37 and 38. As shown, portion 64 is secured to an apertured portion 39 of each of holding members 37 and 38 by means of bolts 65. Attachment 63 has an extension 66 which is shown as formed by bending the member at right angles to portion 64, and extension 66 carries at the outer end thereof a hooked and forked gripping portion 67 for retaining pin 68 at the lower end of saw blade 24.

In employing the apparatus of the invention, the sander 26 when taken from normal use will first have its paper platen removed, exposing the coplanar legs of platen holding members 37 and 38, shown in Figure 4. The attachment 63 is then secured to members 37 and 38 by means of bolts 65 as shown, and these bolts may if appropriate be the same as those used to secure the paper platen in place. The sander is then placed within space 49 between mounting bracket 45 and the work table 13, and the position of the sander adjusted so that the gripping portion 67 of the attachment 63 is substantially below apertured portion 25 of the work table, with the hook facing away from the table. Securing clamps 51 and 52 are then tightened to firmly grip the lower wall 29 of the sander housing, so that the sander is firmly held between the underside of work table 13 and securing bracket 45. The attaching pins 23 and 68 of the saw blade 24 may then be engaged with gripping portion 22 of spring 21 and gripping portion 67 of attachment 64 respectively, the spring 21 being flexed for this purpose.

The jigsaw is now ready for use, and may be actuated merely by operating switch 31 which is easily accessible to the operator as shown. When coil 36 is energized, the vibration of armature 33 will cause corresponding vibration of attachment 63 which is rigidly attached to the armature. It should be noted that the dimensions of attachment 63 are preferably such that there is substantially no flexibility in the gripping portion 67 of the attachment, so that the saw blade may be efficiently vibrated. If it becomes necessary to adjust the springs 42 and 43, this may be done by means of adjusting screw 44 which is accessible from above the work table through clearance aperture 62. When it is desired to use the sander as a sander, it is merely necessary to detach saw blade 24 from attachment 64, remove attachment 63 from the platen holding members 37 and 38 and secure the paper platen to these members.

While it will be apparent that the preferred embodiment of the invention herein disclosed is well calculated to fulfill the objects above stated, it will be appreciated that the invention is susceptible to modification, variation and change without departing from the proper scope or fair meaning of the subjoined claims.

What is claimed is:

1. In combination, a jigsaw having a stand, said stand including a base and a work table spaced above said base, upright means carried by said base and supporting said work table, said upright means being so constructed as to afford ready access to the space between said base and work table, saw blade supporting means attached to said stand and having gripping means for the upper end of a saw blade, an apertured portion in said table for receiving the saw blade therethrough, a bracket secured to said stand having an L-shaped portion below said work table, one portion of said L-shaped bracket being in spaced parallel relation with and below said work table, and a screw type clamp carried by said last-mentioned portion of the bracket and movable in a direction toward and away from said work table, whereby said bracket is adapted to firmly but detachably secure a self-contained power operated hand tool below said work table in an exposed position readily accessible for removal.

2. In combination, a jigsaw having a base and a work table, upright means carried by said base and supporting said work table, said upright means being so constructed as to afford ready access to the space between said base and work table, a saw blade supporting member above said work table for holding the upper end of a saw blade, an apertured portion in said work table for receiving the saw blade therethrough, a self-contained power operated vibratory hand tool of the type having spaced tool supporting elements attached to the armature thereof, clamping means forming part of said jigsaw below said work table, said clamping means including means gripping the housing of said vibratory hand tool rigidly below said work table in an exposed position readily accessible for removal, and an adapting member for connecting the lower end of said saw blade to said vibratory hand tool, said adapting member including a portion secured to said spaced tool supporting elements and a gripping portion substantially below the apertured portion of said work table and holding the lower end of said saw blade.

3. The combination according to claim 2, said clamping means comprising an L-shaped bracket below said work table and having a portion in parallel spaced relation with the work table, and a plurality of screw clamps carried by said last-mentioned portion of the bracket, said screw clamps being movable toward and away from the work table, whereby the housing of said vibratory tool may be gripped between the work table and said screw clamps.

4. The combination according to claim 2, said vibratory tool having a spring engageable with the armature thereof, an adjusting screw for said spring held by the housing of said tool, and an access opening in the work table of said jigsaw for rotating said adjusting screw.

5. In combination, a jigsaw having a stand, said stand including a base and a work table spaced above said base, upright means carried by said base and supporting said work table, said upright means being so constructed as to afford ready access to the space between said base and work table, a saw blade holder secured to said stand and having means for supporting the upper end of a saw blade, an apertured portion in said work table for receiving the blade therethrough, manually adjustable mounting means carried by said stand below said work table, said mounting means including means for firmly but detachably gripping a self-contained vibratory motor in an exposed position readily accessible for removal, and an adapting member for connecting the lower end of said saw blade to said self-contained vibratory motor, said adapting member including a gripping portion substantially below the apertured portion of said work table and holding the lower end of said saw blade, and a portion adapted to be secured to the movable element of said self-contained vibratory motor whereby the lower end of said saw blade may be vibrated.

References Cited in the file of this patent

UNITED STATES PATENTS

| | | |
|---|---|---|
| 1,898,956 | Harvie | Feb. 21, 1933 |
| 1,948,229 | Young | Feb. 20, 1934 |
| 2,233,862 | Dremel | Mar. 4, 1941 |
| 2,308,996 | Miller | Jan. 19, 1943 |
| 2,458,846 | Gilmore | Jan. 11, 1949 |
| 2,466,518 | Wagner | Apr. 5, 1949 |
| 2,602,475 | Andreae | July 8, 1952 |
| 2,611,400 | Shore | Sept. 23, 1952 |
| 2,634,559 | Carmichael | Apr. 14, 1953 |

FOREIGN PATENTS

| | | |
|---|---|---|
| 950,937 | France | Apr. 4, 1949 |